United States Patent [19]

Berthier

[11] 4,295,040
[45] Oct. 13, 1981

[54] DETECTOR ARRANGEMENT FOR DATA-CARD READERS

[75] Inventor: Daniel Berthier, Eybens, France

[73] Assignee: Hewlett-Packard Company, Palo Alto, Calif.

[21] Appl. No.: 8,306

[22] Filed: Feb. 1, 1979

[51] Int. Cl.³ .................... G06K 7/10; G06K 7/14
[52] U.S. Cl. .................... 235/458; 235/454
[58] Field of Search ............ 235/458, 461, 489, 454, 235/455; 250/227, 223, 569, 570; 340/146.3 CA

[56] References Cited

U.S. PATENT DOCUMENTS

| | | | |
|---|---|---|---|
| 2,448,830 | 9/1948 | Robbins | 235/458 |
| 2,603,151 | 7/1952 | Bryce | 235/458 |
| 3,430,057 | 2/1969 | Genahr | 250/227 |
| 3,533,657 | 10/1970 | Da Silva | 235/458 |
| 3,655,945 | 4/1972 | Bowen | 235/454 |
| 3,714,447 | 1/1973 | Jallais | 250/227 |
| 3,896,294 | 7/1975 | Schisselbauer | 235/458 |
| 4,088,265 | 5/1978 | Garczynski | 235/454 |
| 4,125,828 | 11/1978 | Resnick | 340/146.3 CA |

Primary Examiner—Robert M. Kilgore
Attorney, Agent, or Firm—Edward L. Miller

[57] ABSTRACT

A detector arrangement for a data-card reader is capable of reading both punched cards as well as cards marked in writing. A light source emits light in the direction of the data-card surface, and a detector receives the light reflected from said direction and delivers an output signal in response to the intensity of such light. A surface having a reflective power higher than that of the card material is provided at the back of the data-card in essentially parallel relation to the latter. A high-level output signal is obtained when a hole in the card is detected. A medium level is obtained when there is no marking on the card, and a low level is obtained when a pencil mark is encountered on the card.

1 Claim, 3 Drawing Figures

DETECTOR ARRANGEMENT FOR DATA-CARD READERS

BACKGROUND OF THE INVENTION

There have been previously known data-card readers which are suited for reading both punched cards and cards marked by writing. These devices have a system of one or several light sources arranged in the card guiding device opposite the card face, for emitting light in the direction of the data-card. Each light source cooperates with a detector for the light reflected by the card. The wall of the card guiding device facing the reverse side of the card is black so that to someone regarding the face of the card both the holes as well as the writing marks appear as black marks in the light-colored card material surrounding them. While the card material reflects a more or less uniform quantity of the light emitted by the light sources, holes and marks practically do not reflect any light at all. Accordingly, a medium signal level at the detector output signals "no databit", while a low signal level signals "databit".

The disadvantage of the known detector device must be seen in the fact that this device does not allow differentiation between punched holes and writing marks. When reading cards exhibiting only punched marks, there also exists the risk that impurities or stains on the card material may be read as databits.

SUMMARY OF THE INVENTION

It is an object of the present invention to provide a detector device for a card reader which allows to differentiation between data punch holes in a data-card and other marks appearing on the same card.

According to the invention there is provided a detector arrangement for a data-card reader for reading both punched cards as well as cards marked in writing. The detector arrangement comprises a light source emitting light in the direction of the datacard surface, a detector for receiving the light reflected from said direction and for supplying an output signal in response to the intensity of said light, and a surface having a reflective power higher than that of the card material. This reflective surface provided at the back of the data-card is essentially parallel to the latter so that the reflection of the light emitted by the light source produced by the reflective surface is stronger than that produced by the card material.

Just as in the case of the prior art detector arrangements, the detector arrangement of the invention supplies a medium signal level when no holes or marks appear on the card. Writing marks on the card result in a low signal level, whereas holes in the card produce a signal level higher than the medium signal level due to the fact that the surface of the card guiding device facing the reverse side of the card reflects more light than the card material itself. This allows differentiation between the two different types of marks on the card.

DESCRIPTION OF THE PREFERRED EMBODIMENT

Figure 1:
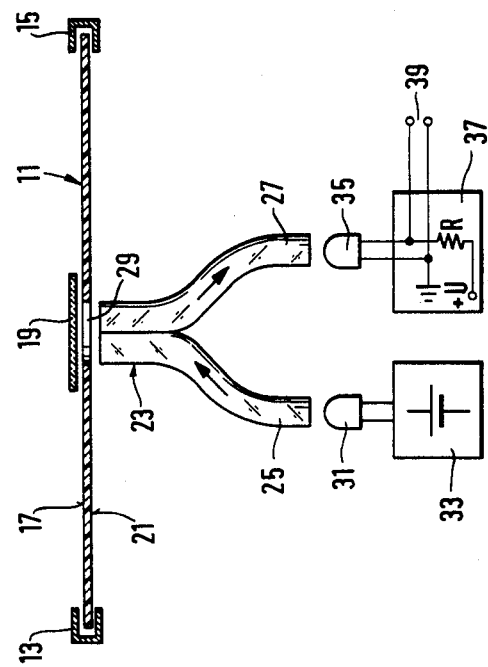
FIG. 1 is a diagrammatic representation of the mechanical arrangement of a detector device by accordance with the present invention.

In FIG. 1 a data-card 11 is shown which is guided in guiding devices 13 and 15 for vertical movement relative to the plane of the marks. At the rear 17 of the data-card 11 a mirror 19 is provided with its surface in parallel arrangement relative to the data-card 11, so that the latter can be moved past it. In front of the face 21 of the data-card 11 there are provided the inlet and outlet areas of a light conductor bunch 23 with individual branches 25 and 27. The light conductor bunch 23 is aligned in a manner to cause the light emitted therefrom to fall upon the mirror 19. From there it is reflected into the light conductor bunch 23 when no data-card 11 is present between the light conductor bunch 23 and the mirror 19, or when the data-card 11 exhibits a hole 29 at the point of reflection, as in the case shown in the example.

Conveniently, the light conductor bunch 23 has a cross-sectional area smaller than that of the holes punched into the data-card. For punched cards of the type commonly used, an area of 3 mm$^2$ (3×1 mm) has been found convenient.

A light source 31, as for instance a light emitting diode connected to a voltage source 33, supplies light into the branch 25. Part of the light emitted by the light source 31 is fed back via the branch 27 to a detector 35, for instance a phototransistor. The quantity of the light fed back to the latter depends upon the condition encountered between the conductor branch 23 and the mirror 19. A maximum amount of light is fed back when no data-card 11 or else a hole 29 is encountered between the light conductor branch 23 and the mirror 19. When a data-card 11 is present and does not exhibit a hole at the point between the light conductor bunch 23 and the mirror 19, the card material itself will reflect to the detector 35 a certain amount of light, but in any case less than that reflected by the mirror 19. A minimum amount of light will be reflected when the data card facing the light conductor bunch 23 exhibits a pencil mark (or any other dark mark).

The detector 35 is connected to a supply circuit 37 supplying at its output 39 an output signal corresponding to the mark encountered on the data-card.

The data-card 11 can be displaced along the guiding devices 13 and 15 for being moved past the light conductor bunch 23 and the mirror 19, in a manner known in the prior art, as for instance by hand or by means of any of the known card conveyer systems, which in turn may also be program-controlled. Further, several of the detector devices shown in FIG. 1 may be used simultaneously, employing a geometrical arrangement of the type known in the art.

Figure 2:
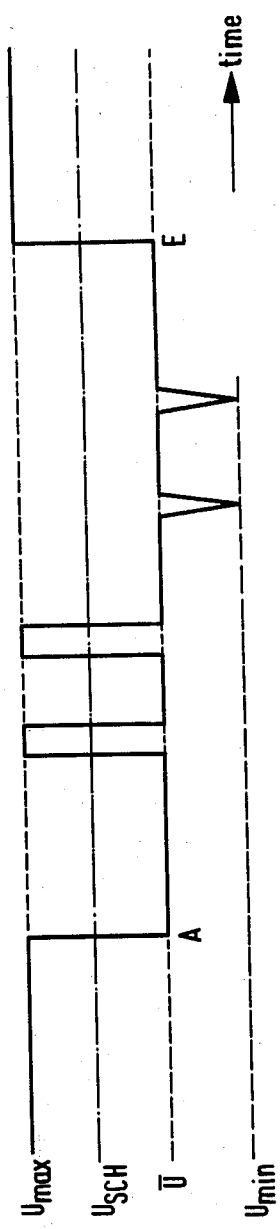
FIG. 2 shows the output signals supplied by the detector of FIG. 1 when a data-card with holes and pencil marks is moved past the detector.

FIG. 2 shows the voltage signals that may be obtained at the output 39. The illustration reflects a situation where a data-card was moved along the detector device over its full length and two holes and two pencil marks were detected.

So long as no data-card is present between the mirror 19 and the fiber glass bunch 23, the output signal exhibits a maximum level of U$_{max}$. When the leading edge of the data-card enters the area of the detector device at the moment A, the signal level drops to a medium level $\overline{U}$ corresponding to the reflecting power of the card-material. Holes in the data-card result in pulses of the level $U_{max}$, whereas pencil marks on the card make the pulse level drop to $U_{min}$. When the card has been moved past over its full length (moment E), the pulse level rises again to $U_{max}$.

As is apparent from FIG. 2, the pulses corresponding to holes on the one hand and pencil marks on the other hand are oppositely directed so that a clear differentiation is possible at the output 39.

Figure 3:
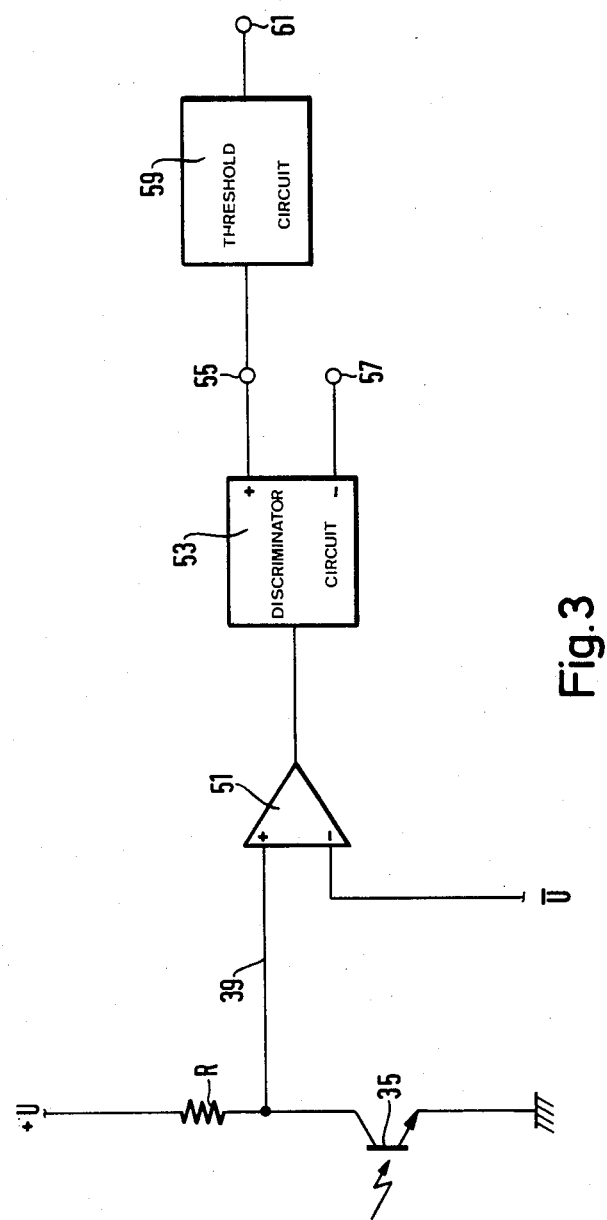
FIG. 3 shows a block diagram of a possible evaluation circuit for the signals shown in FIG. 2.

FIG. 3 is a diagrammatic representation of a possible arrangement for processing the pulses obtained.

The output signal obtained at the output 39 is supplied to a positive input of a subtraction amplifier 51 to whose negative input a voltage $\overline{U}$ is supplied. Accordingly, the output signal of the subtraction amplifier 51 is equal to zero when a data-card exhibiting neither a hole nor a pencil mark is present in the area of the detector device. A hole will result in a positive output signal of the subtraction amplifier 51, while a pencil mark will cause a negative output signal. A discriminator circuit 53 connected to the output end of the subtraction amplifier 51 separates the two polarities so that a signal is obtained at the output 55 of the discriminator circuit 53 when the detector device detects a hole in the data-card, while a signal is obtained at the output 57 when the detector device detects a pencil mark on the data-card.

The detector arrangement described above may also be modified to detect only holes in the data-card while disregarding any other marks. Such a modification could be desirable, for instance, when soiled data cards are used, a condition which may be encountered for instance in the rough operation of the control of machine tools.

In this case, the output 55 of the discriminator circuit 53 is connected to a threshold value detector 59 which will emit a signal at its output 60 only when the signal level obtained at the output 55 exceeds a threshold level $U_{SCH}$ which is higher than U but lower than $U_{max}$. An example of $U_{SCH}$ is shown in FIG. 2. Now, a signal is obtained at the output 61 only when a hole is detected in the data-card. Spurious signals of any type are suppressed.

I claim:

1. A card reader for reading cards marked either by holes or by writing and providing an output indicative not only of the presence or absence of a mark but of the type of mark as well, the card reader comprising:

a light source emitting light toward a principal surface of a card to be read;

a reflective surface having a reflective power greater then that of the unmarked surface of the card and located parallel to an opposite surface of the card, for reflecting light reaching the reflective surface via a hole in the card back through the hole;

an optical detector for receiving light of a first intensity reflected from marks indicated by writing on the card, light of a second intensity greater than the first reflected from the unmarked surface of the card, and light of a third intensity greater than the second reflected from the reflective surface through marks indicated by holes in the card, and for producing a sense signal whose amplitude is indicative of the amount of light reaching the optical detector; and level detection means coupled to the sense signal for producing an output signal having three distinct values respectively indicative of the presence of a mark produced by a hole, the presence of a mark produced by writing, and the absence of a mark.

* * * * *

UNITED STATES PATENT AND TRADEMARK OFFICE
CERTIFICATE OF CORRECTION

PATENT NO. : 4,295,040

DATED : October 13, 1981

INVENTOR(S) : Daniel Berthier

It is certified that error appears in the above-identified patent and that said Letters Patent are hereby corrected as shown below:

Column 1, line 33, delete "to";

Column 1, line 40, "datacard" should be --data-card--;

Column 1, line 64, "by" should be --in--;

Column 1, line 66, "FIG.." should be --FIG.--;

Column 2, line 6, "in" (second occurrence) should be --by--;

Column 4, line 3, "U" (first occurrence) should be --Ū--;

On the title page at line "[73]", the assignee should be listed as --Hewlett-Packard France S.A., Eybens, France--.

Signed and Sealed this

Twelfth Day of January 1982

[SEAL]

Attest:

Attesting Officer

GERALD J. MOSSINGHOFF

Commissioner of Patents and Trademarks